(12) United States Patent
Nan

(10) Patent No.: US 10,532,806 B2
(45) Date of Patent: Jan. 14, 2020

(54) LOW-NOISE NOVEL THRUSTER

(71) Applicant: Yanjin Nan, Guangdong (CN)

(72) Inventor: Yanjin Nan, Guangdong (CN)

( * ) Notice: Subject to any disclaimer, the term of this patent is extended or adjusted under 35 U.S.C. 154(b) by 38 days.

(21) Appl. No.: 15/920,439

(22) Filed: Mar. 13, 2018

(65) Prior Publication Data

US 2019/0023376 A1  Jan. 24, 2019

(30) Foreign Application Priority Data

Jul. 18, 2017 (CN) .......................... 2017 1 0583774

(51) Int. Cl.
*B64C 11/00* (2006.01)

(52) U.S. Cl.
CPC ........ *B64C 11/001* (2013.01); *F05D 2240/12* (2013.01); *F05D 2240/30* (2013.01); *F05D 2260/96* (2013.01)

(58) Field of Classification Search
CPC ..................................................... B64C 11/001
See application file for complete search history.

(56) References Cited

U.S. PATENT DOCUMENTS

| | | | | |
|---|---|---|---|---|
| 5,096,382 A * | 3/1992 | Gratzer | .................... | B63H 1/16 416/189 |
| 5,342,167 A * | 8/1994 | Rosseau | ................ | F04D 29/666 415/119 |
| 5,820,345 A * | 10/1998 | Giffin, III | ............. | B64C 11/001 416/128 |
| 6,398,492 B1 * | 6/2002 | Cho | ....................... | F04D 29/544 415/191 |
| 2009/0068033 A1 * | 3/2009 | Ishiba | ................... | B64C 11/001 417/408 |
| 2010/0040458 A1 * | 2/2010 | Bushnell | ............... | F04D 29/164 415/173.6 |
| 2010/0068028 A1 * | 3/2010 | Bushnell | ............... | F04D 29/164 415/1 |
| 2016/0290348 A1 * | 10/2016 | Mornan | ................... | F04D 17/06 |
| 2017/0104385 A1 * | 4/2017 | Salamon | ................... | B63H 3/06 |
| 2018/0231016 A1 * | 8/2018 | Power | ..................... | B64C 11/06 |
| 2019/0178252 A1 * | 6/2019 | Dygert | .................. | F04D 19/002 |

* cited by examiner

*Primary Examiner* — Woody A Lee, Jr.

(57) ABSTRACT

The present invention discloses a low-noise novel thruster, in which a rotor casing is located at an air inlet side of a stator casing, at an inner middle portion of the rotor casing a rotor core is provided which is driven to rotate by a driving module; a rotor core is provided at in inner middle portion of the stator casing; the rotor casing is of a streamlined cylindrical structure with unequal diameter, and the main body of the rotor blade is parallel with the axial direction, and provided with a smooth curve in the rotating direction of the blade adjacent to an edge portion of an air inlet side. The present application provides a new thruster, which has same energy consumption and safety as propellers, but at a significantly greater thrust than the propeller, the more significant the advantage is at higher speeds.

7 Claims, 5 Drawing Sheets

LOW-NOISE NOVEL THRUSTER

BACKGROUND OF THE INVENTION

The present invention relates to the field of thrusters, and particularly to a low-noise novel thruster.

The advent of the aircraft for more than a hundred years, the propeller has always been the main means of motive force. So far, with the exception of some large aircraft and fighter jets, the vast majority of aircraft are still of propellers. However, the disadvantage of the propeller is that as the speed is lower, the efficiency is lower, such that at this moment, the maximum speed of the propeller aircraft is only about 600 km. Meanwhile, the jet engine is not only high cost and energy consumption, but also for the majority of private users, it needs unacceptably long runway, is not safe enough, and has potential dangers.

Therefore there is an urgent need for a new type of thruster on the market that requires the same energy and safety as the propeller and at the same time the thrust is significantly greater than the propeller's.

BRIEF SUMMARY OF THE INVENTION

In view of the above problem, the present invention aims to provide a new low-noise thruster that has more thrust, less air interference and higher energy conversion efficiency than conventional propellers.

In order to achieve the technical object, the present invention provides a low-noise novel thruster, which comprises a driving module, a rotor casing and a stator casing, wherein the rotor casing is located on the air inlet side of the stator casing, an inner middle portion of the rotor casing is provided with a rotor core which is driven to rotate by the driving module, and a plurality of rotor blades are arranged between the rotor core and the rotor casing;

a stator core is provided at the inner middle portion of the stator casing, and a plurality of stator vanes are provided between the stator core and the stator casing;

the rotor casing is of a streamlined cylindrical structure with unequal diameter, the rotor blade is parallel to the axial direction, and is provided with a smooth curve in the rotating direction of the blade adjacent to an edge portion of an air inlet side.

Preferably, the rotor core is of a streamline body structure, and a gap for compressing airflow is provided between the rotor core and the rotor casing.

Preferably, an inner diameter of an air outlet side of the rotor casing is larger than an inner diameter of the air inlet side.

Preferably, the air inlet of the stator vane is inclined in a direction opposite to the direction in which the rotor casing is rotated, the angle of inclination of the stator vane gradually and smoothly transitions parallel to the axial direction toward the air outlet side, an outer rim of the stator vane is fixedly connected with the stator casing, and an inner rim is fixedly connected with the stator core.

Preferably, the stator core is of a streamlined cone structure or a streamlined round table structure, and a gap for airflow is provided between the stator core and the stator casing.

Preferably, an outer rim of the rotor blade is fixedly connected with the rotor casing, an inner rim of the rotor blade is fixedly connected with the rotor core, and when the driving module is started, the rotor core is driven to rotate along with the rotor blade and the rotor casing.

Preferably, a bending angle of the curved portion of the rotor blade is between 0° and 60°; and a bending angle of the stator vane is between 0° and 60°.

Beneficial Effects of the Invention: The present application provides a new type of thruster, the energy consumption and the safety of which are equivalent to that of the propeller, and the thrust force of which is significantly larger than that of the propeller. This advantage is increasingly significant with higher speed, thereby largely enhancing the speed and load capacity of the conventional propeller aircraft. Compared to conventional propellers, the thruster of the present application generates at least three times the thrust at equal diameters and equal speeds, and the larger the flight speed, the greater the difference. This means that the aircraft and various types of aircraft will fly faster and carry more.

DETAILED DESCRIPTION OF THE INVENTION

The present invention will be further described in detail below with reference to the accompanying drawings and specific embodiments.

Figure 1:
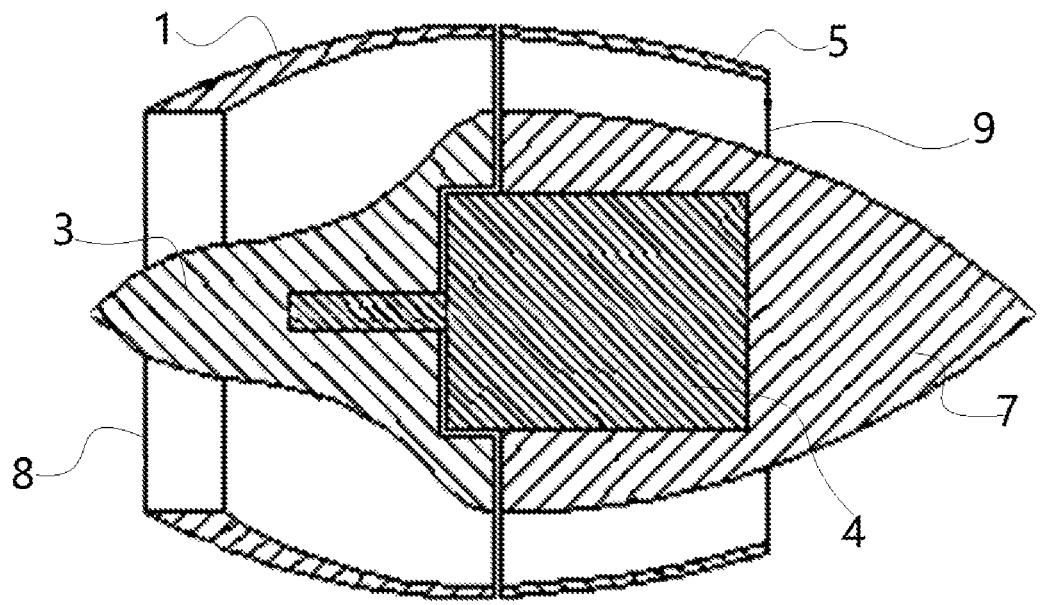
FIG. 1 is a front section view of the present invention.
Figure 2:
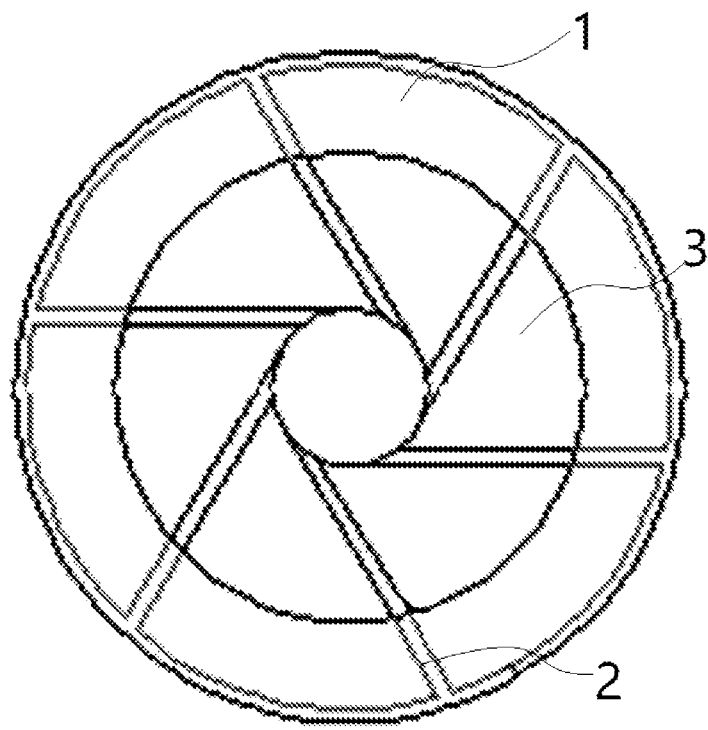
FIG. 2 is a schematic structural view of the front view of the present invention.
Figure 3:
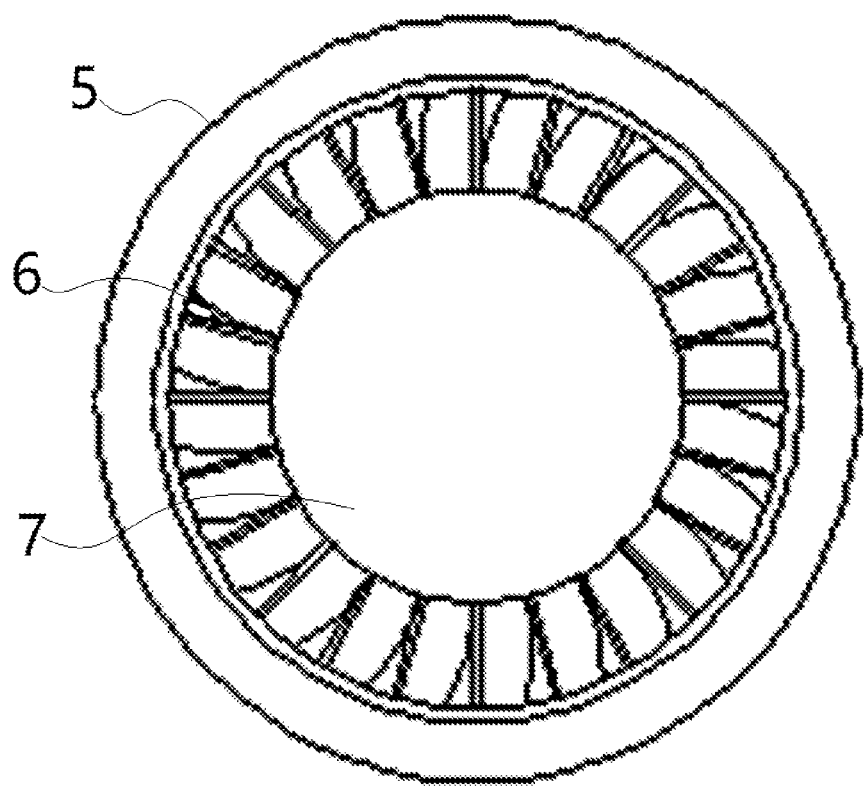
FIG. 3 is a schematic structural view of the rear view of the present invention.
Figure 4:
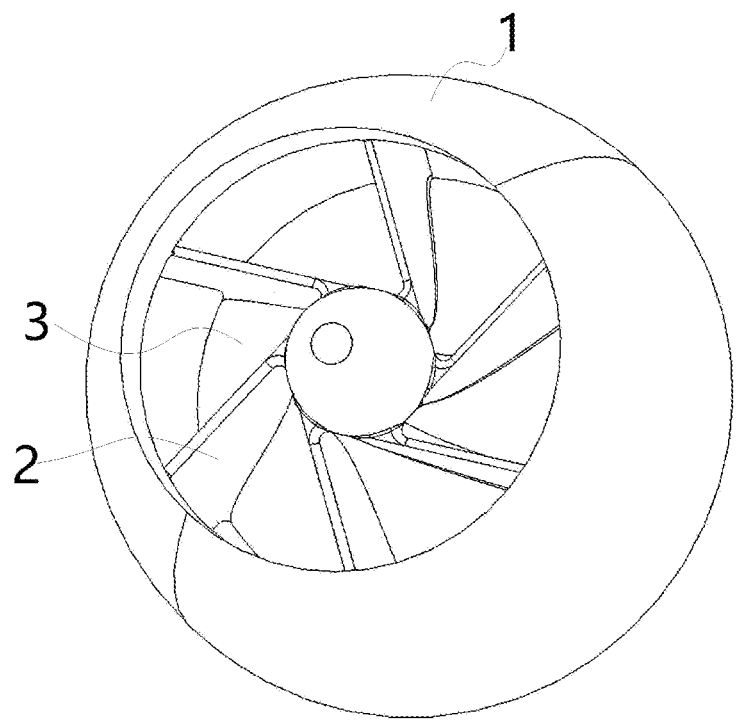
FIG. 4 is a perspective view of the rotor casing, the rotor core and the rotor blade of the present invention.
Figure 5:
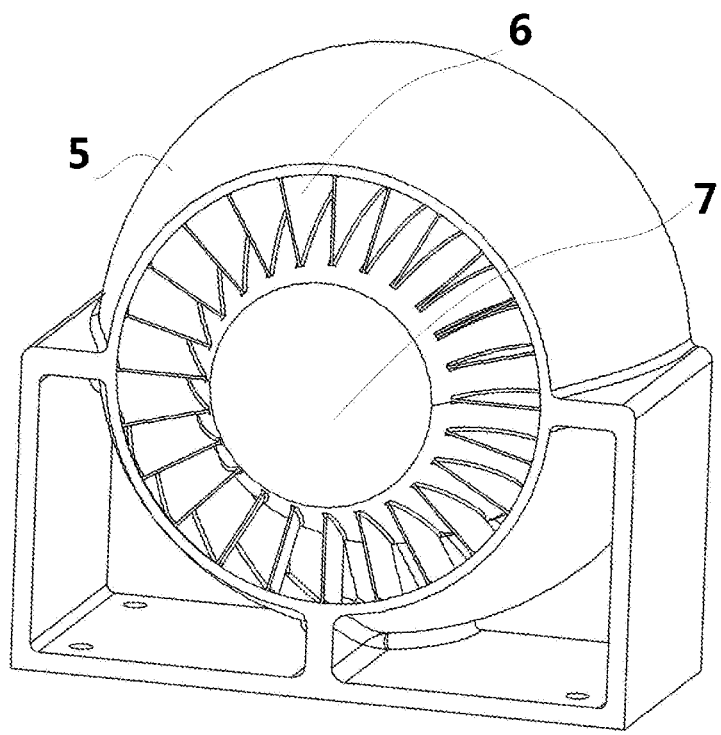
FIG. 5 is a perspective view of the stator casing, the stator core and the stator vane of the present invention.
Figure 6:
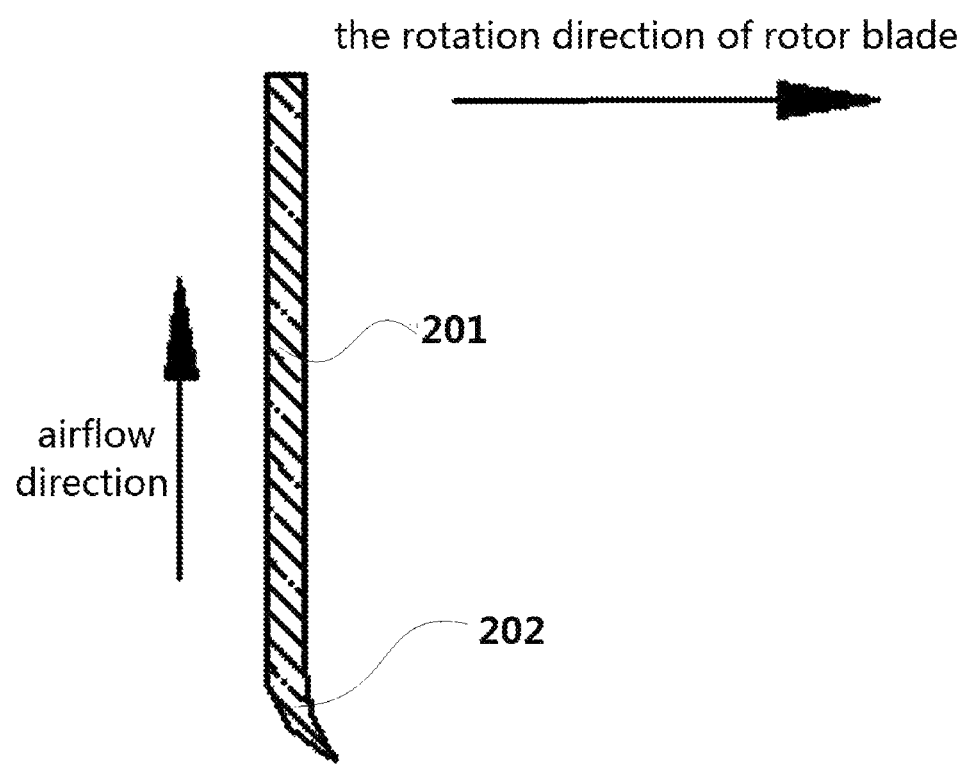
FIG. 6 is a partial section view of the rotor blade of the present invention.
Figure 7:
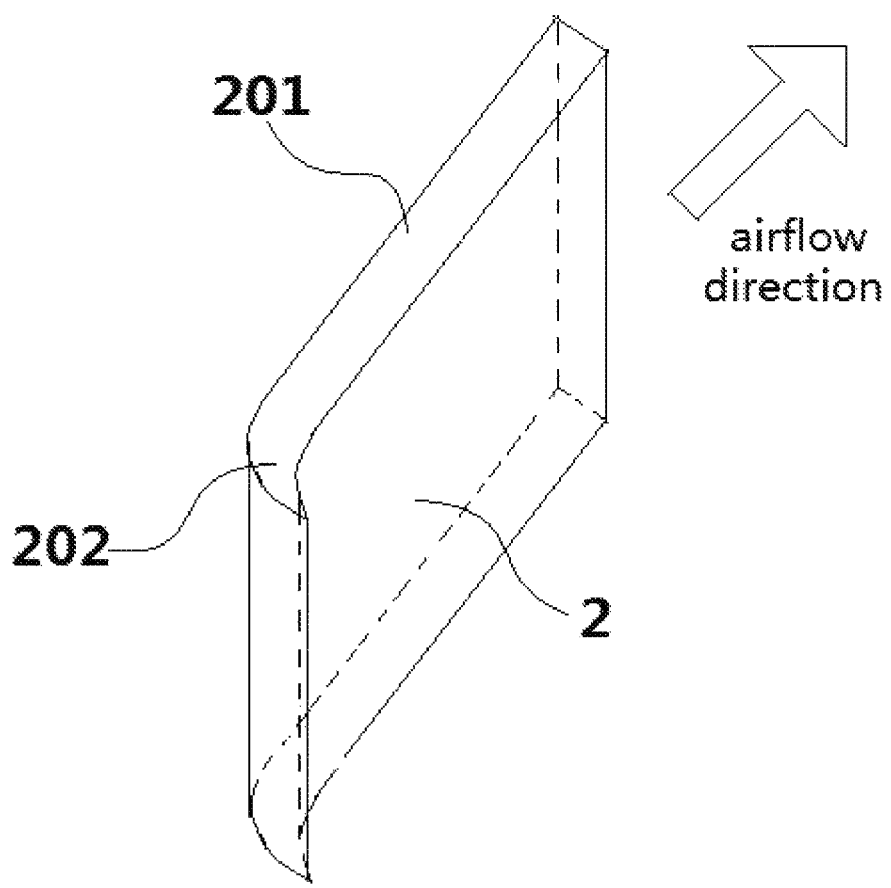
FIG. 7 is a partial perspective view of the rotor blade of the present invention.

As shown in FIG. 1-7, a specific embodiment of the present invention is a low-noise novel thruster, which includes a driving module 4, a rotor casing 1 and a stator casing 5. The rotor casing 1 is located at an air inlet side of the stator casing 5. A rotor core 3 is arranged in the inner middle portion of the rotor casing 1. The rotor core 3 is driven to rotate by the driving module 4. Between the rotor core 3 and the rotor casing 1 a plurality of rotor blades 2 are provided. The driving module may be located at the inner middle portion of the stator casing, but also may be located outside the stator casing and drivingly connected to the rotor core.

A stator core 7 is provided at the inner middle portion of the stator casing 5 and a plurality of stator vanes 6 are provided between the stator core 7 and the stator casing 5.

The rotor casing is of a streamlined cylindrical structure with unequal diameter, and the rotor blade 2 is consisted of a curved portion 202 which is used as an edge and is positioned at the air inlet side of the rotor blade 2 and is curved in the rotating direction and a blade portion 201 which is used as a main body and is parallel to the axial direction of a rotary shaft. Conventional blades are usually helical propeller blades. Conventional blades have a certain inclination angle and their axial projection width is greater than the blade thickness.

In the present application, the main body of the rotor blade is parallel to the axial direction and is a pure centrifugal blade. The effect on the air is only to accelerate the rotation. The high pressure generated by the centrifugal force causes the air to be ejected from the large diameter side of the rotor casing (conventional propellers rely on the axial component of the air generated by the rotating inclined blades to propel the airflow). The design is conducive to produce high-speed airflow, increase thrust, and can effectively reduce turbulence and improve energy conversion efficiency. At the same time, the curved portion located on the air inlet side of the rotor blade can effectively reduce the noise brought by the process of air compressing of the rotor blade, further reducing the airflow interference and improving the performance of the thruster.

In order to better guide the airflow, the rotor core 3 is of a streamline body structure, and a gap for compressing airflow is provided between the rotor core 3 and the rotor casing 1. The rotor core of the streamlined body is able to facilitate the directing of the ejection of air from the rotor casing.

In order to better guide the airflow, an inner diameter of the air outlet side of the rotor casing 1 is larger than an inner diameter of the air inlet side. The rotation of the rotor blade leaves centrifugal force, causing the formation of negative pressure inside the rotor casing near axial center, and the formation of positive pressure at distal side. The rotor casing has a smaller front end and a larger rear end, such that the high pressure air is ejected from the larger diameter side and sucked into from the smaller diameter side.

In order to better drain airflow, the outer rim of the stator vane 6 is fixedly connected with the stator casing 5, and the inner rim of the stator vane 6 is fixedly connected with the stator core. The stator core is of a streamlined cone structure or a streamlined truncated cone structure, and the stator core may be hollow in order to dispose the driving module and place other objects. A gap for airflow is provided between the stator core 7 and the stator casing 5. An inclining angle of a guide channel which is consisted of the stator casing, the stator vane and the stator core gradually and smoothly transitions to the stator vane which is parallel in axial direction, such that the airflow can be effectively guided to be sprayed almost parallel to the axial direction, and the streamlined stator casing is cooperated with the streamlined stator core to form ideal drainage channels.

In order to better drain the airflow, the air inlet side of the stator vane 6 is inclined to the opposite direction of rotation of the rotor casing 1, and the inclination angle of the stator vane 6 gradually transitions to the air outlet side smoothly to be parallel with the axial direction. The airflow passing through the stator vane in this configuration has been changed from a rotating state to a parallel state when it is discharged from the stator casing.

In order to enhance the effect of centrifugal pressurization of the air to form a high-speed rotating airflow, the outer rim of the rotor blade 2 is fixedly connected with the inner side of the rotor casing 1, and the inner rim of the rotor blade is fixedly connected with the rotor core 3. When the driving module is started, the rotor core 3, the rotor blade 2 and the rotor casing 1 are driven to rotate together. Normally, the rotor casing 1 may be connected to the stator casing 5 rather than being connected to the rotor blade 2, and the air may be pressed only by the rotor blade 2. However, when the rotor blade 2 is fixedly connected to the rotor casing 1, the friction loss is minimal and the ejection velocity is faster.

In order to increase the air intake effect and reduce the noise, the bending angle of the curved portion of the rotor blade 2 is between 0° and 60°; the bending angle of the stator vane 6 is between 0° and 60°, i.e., the bending angle of the curved portion of the rotor blade is between 0° and 60°.

Working principle: The driving module drives the rotor casing, the rotor blade and the rotor core rotate at a high speed. The air inlet 8 is shown from at left side in FIG. 1, and the air outlet 9 is shown at the right side in FIG. 1. With the centrifugal force of the blade 2, the inside air is squeezed to the periphery so that a positive pressure is formed in the peripheral portion and a negative pressure is formed in the vicinity of the axial center portion so that the air is sucked into from the smaller diameter side of the rotor casing 1 and ejected from the vicinity of the larger diameter side in a rotating state, and then the airflow enters the drainage channel consisting of the stator casing 5, the stator vane 6 and the stator core 7. Since the shapes of the stator vanes 6 are transitional from oblique to parallel in the axial direction, the air flow has changed from a rotating state to a parallel state when it is emitted from the stator casing. This application can be used not only in gas but also liquids.

The most obvious advantages of this application compared to conventional propellers are:

1) The blade tip speed of the traditional propeller is far greater than the flight speed of the aircraft, so when the flying speed reaches six or seven hundred kilometers, the speed of the tip reaches the speed of sound and the power is lost. However, even if the flying speed exceeds 800 km/h, the present invention does not have any part of the air inlet exceeding the speed of sound, and the discharged air speed can approach the speed of sound and thus generate a strong thrust.

2) The airflow discharged by the traditional propeller contains too much turbulence, so the energy loss is large and the efficiency is low. In the present application, the gas flows in the same direction with low loss, so the thrust is greater.

3) The structure of this application is not only suitable for fixed-wing aircraft flying at high speed, but also very suitable for helicopters. It is particularly suitable for being the shape of a flying saucer and has no external torque in single engine, which in turn is the propeller can not do.

The foregoing descriptions are merely preferred embodiments of the present invention and are not used to limit the present invention. Any minor modifications, equivalent substitutions and improvements made to the above embodiments according to the technical spirit of the present invention should be included in the scope of protection of the technical solution of the present invention.

What is claimed is:

1. A low-noise novel thruster, comprising a driving module, a rotor casing and a stator casing, wherein the rotor casing is located at an air inlet side of the stator casing, an inner middle portion of the rotor casing is provided with a rotor core which is driven to rotate by the driving module, and a plurality of rotor blade is provided between the rotor core and the rotor casing;

a stator core is provided at the inner middle portion of the stator casing, and a plurality of stator vanes are provided between the stator core and the stator casing;

the rotor casing is of a streamlined cylindrical structure with unequal diameter, the rotor blade is curved in the rotating direction at a leading edge of the rotor blade which is directly adjacent an inlet edge of the inlet side; and a main body of the blade aft of the leading edge is parallel with an axial direction.

2. The low-noise novel thruster according to claim 1, characterized in that the rotor core is of a streamlined structure, and a gap for compressing airflow is provided between the rotor core and the rotor casing.

3. The low-noise novel thruster according to claim 1, characterized in that the inner diameter of an air outlet side of the rotor casing is larger than the inner diameter of the air inlet side.

4. The low-noise novel thruster according to claim 1, characterized in that the air inlet side of the stator vane is inclined with respect to the direction opposite to the rotating diction of the rotor casing, the stator vane is transitional from oblique to parallel in the axial direction, an outer rim of the stator vane is fixedly connected with the stator casing, and inner rim is fixedly connected with the stator core.

5. The low-noise novel thruster according to claim 1, characterized in that the stator core is of a streamlined cone structure or a streamlined round table structure, and a gap for airflow is provided between the stator core and the stator casing.

6. The low-noise novel thruster according to claim 1, characterized in that the outer rim of the rotor blade is fixedly connected with the rotor casing, the inner rim of the rotor blade is fixedly connected with the rotor core, and when the driving module is started, the rotor core is driven to rotate along with the rotor blade and the rotor casing.

7. The low-noise novel thruster according to claim 1, characterized in that the bend angle of the curved portion of the rotor blade is between 0° and 60°, and the bending angle of the stator vane is between 0° and 60°.

* * * * *